(No Model.)
W. MANSFIELD.
NUT LOCK.
No. 473,193. Patented Apr. 19, 1892.
FIG. 1.
FIG. 2.
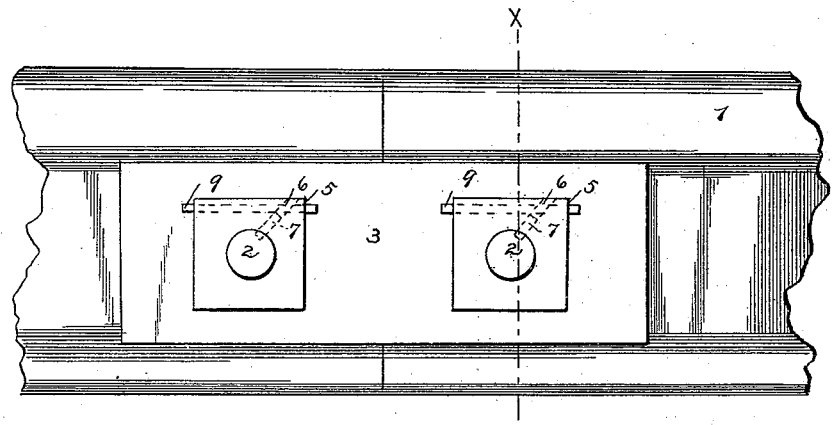
FIG. 3.
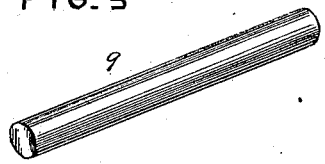
FIG. 4.
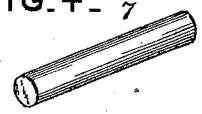
FIG. 5.
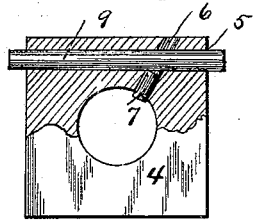
Witnesses:
B. S. Ober
W. S. Duval
Inventor
William Mansfield
By his Attorneys,
C. A. Snow & Co.

United States Patent Office.

WILLIAM MANSFIELD, OF ASHVILLE, PENNSYLVANIA.

NUT-LOCK.

SPECIFICATION forming part of Letters Patent No. 473,193, dated April 19, 1892.

Application filed April 15, 1891. Serial No. 389,042. (No model.)

*To all whom it may concern:*

Be it known that I, WILLIAM MANSFIELD, a citizen of the United States, residing at Ashville, in the county of Cambria and State of Pennsylvania, have invented a new and useful Nut-Lock, of which the following is a specification.

This invention relates to improvements in nut-locks, the object in view being to provide an extremely cheap and simple device adapted to be applied to the ordinary construction of nuts and adapted to effectively lock the nut upon the bolt.

Other objects and advantages of the invention will appear in the following description, and the novel features thereof will be particularly pointed out in the claim.

Referring to the drawings, Figure 1 is a side elevation of a portion of a railway-joint, the nuts of the bolts of which are locked in accordance with my invention. Fig. 2 is a sectional view on the line $x\,x$ of Fig. 1, through the nut. Fig. 3 is a detail of the locking-pin. Fig. 4 is a detail of the locking-key. Fig. 5 is a section of the nut in detail, the pin and key being in position.

Like numerals of reference indicate like parts in all the figures of the drawings.

1 denotes the rail, 2 the bolts passed through the fish-plates 3 and the rails, and 4 the nuts. These nuts are of the ordinary construction, with the exception that a hole is drilled from one side to the other thereof or through and through the same near one face, as shown at 5, and a second hole 6 is drilled at an angle to the hole 5 and extends from one face of the nut to the threaded opening. A short locking-pin 7 is inserted in the hole 6 and extends from the inner edge of the hole to a point slightly in advance or beyond the point of intersection of the two holes 5 and 6.

In operation, a nut containing such a pin is mounted on the bolt, said bolt freely rotating and not being impeded by the pin, in that it is well back in its opening, and after it is screwed to position a locking-key 9 is passed through the opening 5, in which opening it is driven, and acting against the outer end of the locking-pin forces the inner end of the latter to impinge upon and take between the threads of the bolt. It will now be evident that the bolt is securely fastened in position and can only be removed by employing a punch to drive out the locking-key. When the locking-key has been removed, the threads of the bolt will be found free from injury by reason of the fact that the inner end of the locking-pin takes between the threads.

A fastening device of the above description may be produced at an extremely slight cost of manufacture, is easily applied, and is very efficient in operation.

Having described my invention, what I claim is—

The combination of a bolt, a nut having a key-opening 5 extending entirely across the nut and terminating at opposite sides thereof and provided with a pin-opening 6, arranged at an angle to the threaded opening and communicating with the same and intersecting the key-opening and having its outer end terminating at one side of the nut, a locking-pin arranged in the pin-opening 6, and a key arranged in the key-opening and securing the locking-pin in place and projecting from opposite sides of the nut, substantially as described.

In testimony that I claim the foregoing as my own I have hereto affixed my signature in presence of two witnesses.

WILLIAM MANSFIELD.

Witnesses:
RICHARD IVORY,
H. C. ELLWANGER.